June 26, 1962 C. VAN DER LELY ET AL 3,041,076
SPREADER FOR GRANULAR OR POWDERY MATERIAL
Filed April 21, 1958 3 Sheets-Sheet 1

INVENTORS.
Cornelis van der Lely.
BY Ary van der Lely.

Mason & Mason
Attorneys.

June 26, 1962 C. VAN DER LELY ET AL 3,041,076
SPREADER FOR GRANULAR OR POWDERY MATERIAL
Filed April 21, 1958 3 Sheets-Sheet 2

INVENTORS.
Cornelis van der Lely.
ARY VAN DER LELY
BY Mason & Mason
Attorneys.

June 26, 1962 C. VAN DER LELY ET AL 3,041,076
SPREADER FOR GRANULAR OR POWDERY MATERIAL
Filed April 21, 1958 3 Sheets-Sheet 3
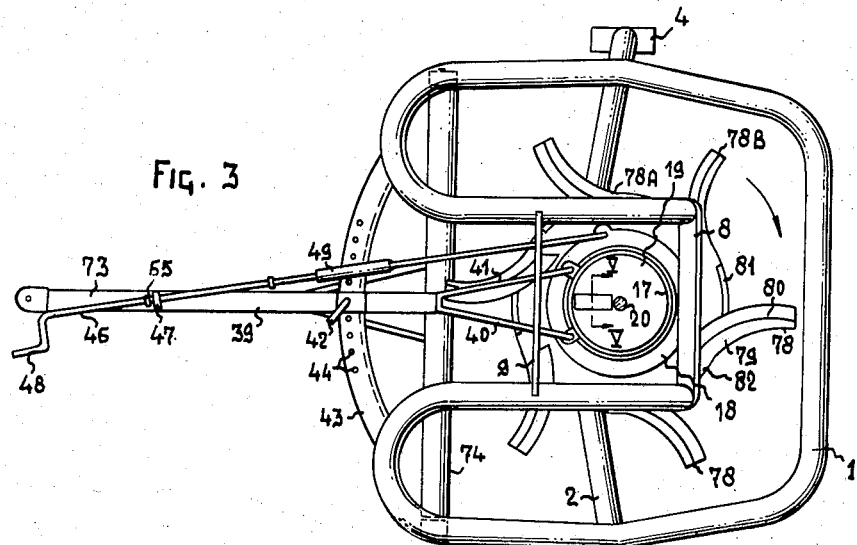
Fig. 3
Fig. 5
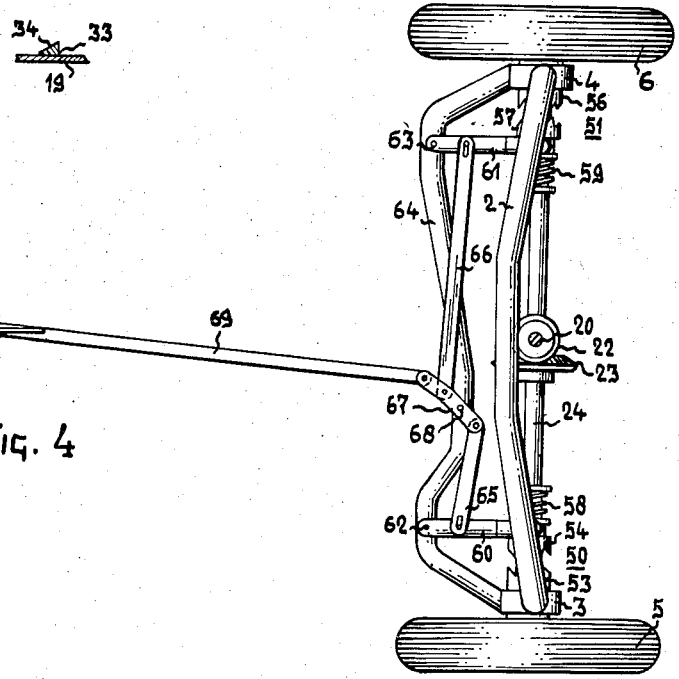
Fig. 4
INVENTORS,
Cornelis van der Lely
Ary van der Lely.
BY
Mason & Mason
Attorneys.

United States Patent Office 3,041,076
Patented June 26, 1962

3,041,076
SPREADER FOR GRANULAR OR
POWDERY MATERIAL
Cornelis van der Lely and Ary van der Lely, Maasland, Netherlands, assignors to C. van der Lely N.V., Maasland, Netherlands, a Dutch limited-liability company
Filed Apr. 21, 1958, Ser. No. 729,745
9 Claims. (Cl. 275—8)

This invention relates to devices for spreading granular or pulverulent material, of the kind provided with an ejector disc rotating about an axis of rotation and a container having an outlet aperture, the ejector disc constituting at least part of the bottom of the container; these devices are known per se.

In order to obtain a satisfactory joint between the container and the ejector disc, the known devices of the said kind require high precision machining of the joined parts of the container and the ejector disc, so that these devices might be costly.

The invention has for its object to provide a satisfactory tight joint between the container and the disc in a simple and cheap manner. In accordance with the invention this is achieved by constructing parts of the container wall near the ejector disc so as to form an annulus, which rests on the ejector disc. This construction permits at the same time an easy adjustment of the outlet apertures with respect to the disc in order to ensure a satisfactory spreading.

It is another advantage of the invention that the side wall of the container has at least two apertures through which the material is supplied to the ejector disc. By supplying the material at two or more places to the ejector disc, a satisfactory distribution of the material over a broad strip is obtained.

A further aspect of the invention is that the container is supported by a curved frame beam, and the rotating ejector disc is arranged below the container. The frame beam extends forwardly from the container over the ejector disc and then downwardly and rearwardly below the ejector disc to the rear of the device. It is thus ensured that the material spread by the ejector disc does not encounter parts of the device, so that a uniform distribution of the material will not be disturbed.

In order to obtain an optimum and even distribution of the material and for spreading it over a very broad area, the rotating ejector disc is provided, in accordance with a further aspect of the invention, with blades, which are curved viewed from above, and of which the convex side is bent rearwardly with respect to the direction of rotation of the ejector disc.

A favourable shape of the blade is that of a channel, of which the side walls are at an angle to each other of less than 90°. This construction ensures that the material cannot be ejected before it has reached the end of the blade. In order to enlarge the width of the strip over which the material is spread, it is advantageous when the blades are inclined upwardly with respect to the plane of the disc. In that case also the ejector disc and the container can be mounted lower in the frame, resulting in a low centre of gravity and an easy to fill up container.

A further aspect of the invention consists in that the rotating ejector disc, which serves as the bottom of the container, is provided with a member acting upon the material, and having a surface inclining upwardly with respect to the direction of rotation of the disc. Thus the material in the container is kept moving, so that choking at the outlet apertures is avoided.

A satisfactory supply of material from the container is obtained by providing an agitator in the container, which agitator is linked to a rotating, substantially vertical shaft by means of a universal joint and has approximately half the height of the container or less.

In accordance with a further aspect of the invention the top side of the rear wall of the container is provided with an edge extending inwardly, so that bags of material to be emptied; into the container can be placed on this edge without being damaged. If the material is introduced into the container from the front side, this edge constitutes, moreover, a screen for retaining scattering material.

The invention relates furthermore to a rotating ejector disc, which is provided with a blower, which is capable of producing a stream of air directed away from the ejector disc, so that very fine, light material is thrown farther from the device by this flow of air.

In order to facilitate cleaning of the said device, it is advantageous to secure the container to the device by means of a locking member so that the container can be detached readily from the frame in order to clean the various components.

Further objects and advantages will be evident from the description of a preferred embodiment shown in the accompanying drawing.

In the drawings:

FIGURES 3 and 4 are plan views of parts of the device shown in FIG. 1, taken on different horizontal planes and with some parts omitted and with the vertical drive shaft shown in section;

FIGURE 5 is a sectional view taken on the line V—V of FIG. 3;

Figure 1:
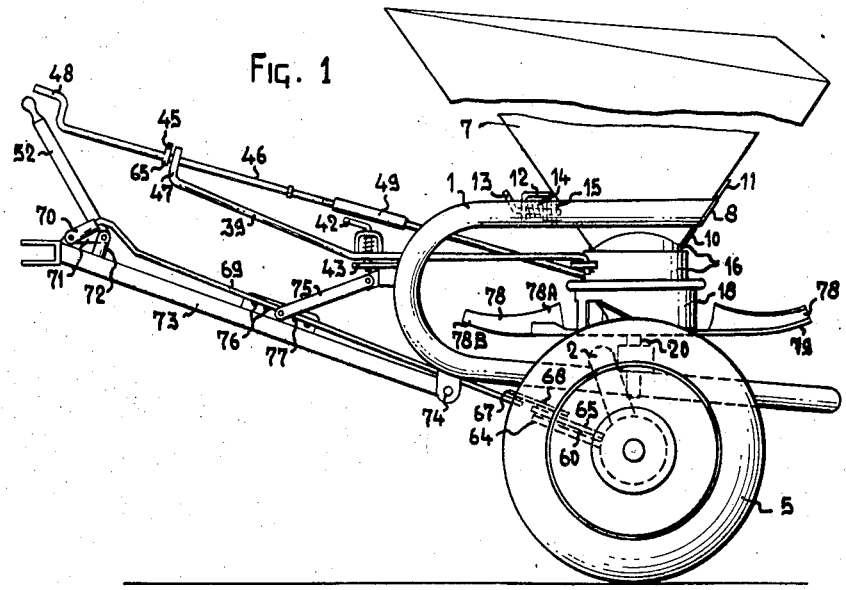
FIGURE 1 is a side view in elevation of a device according to the invention for spreading granular or powdery material, parts being shown in section for the sake of clarity.
Figure 1A:
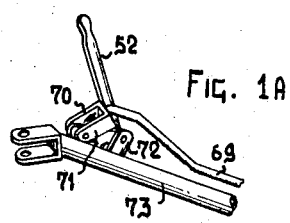
FIGURE 1A is a detail view in perspective showing the forward end of the draw means, and the clutch releasing means.
Figure 1C:
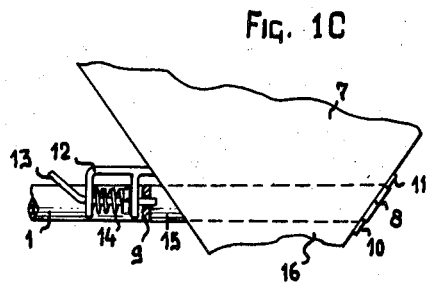
FIGURE 1C is an enlarged detail view of the latching device which releasably holds the container in the frame member.
Figure 1B:
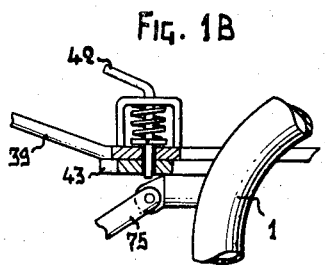
FIGURE 1B is an enlarged detail view with parts broken away of the means used to adjust the position of the annulus arranged around the lower end of the container.
Figure 2:
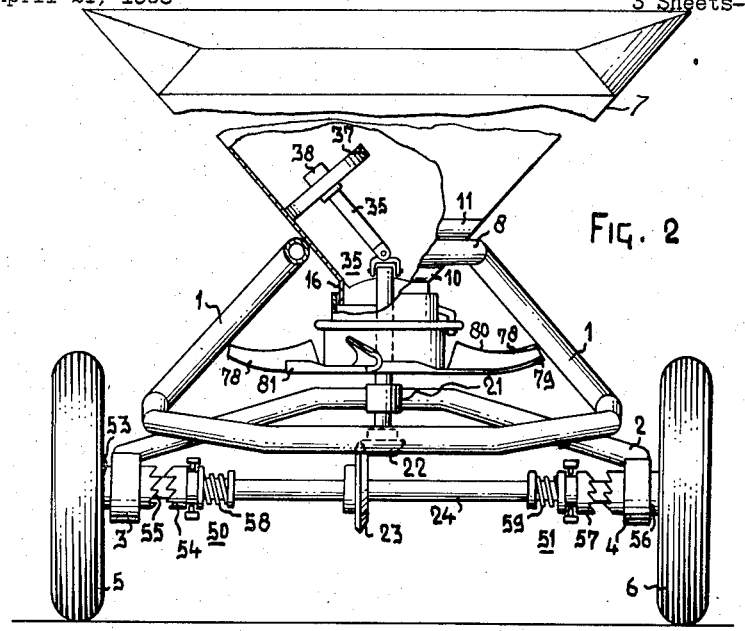
FIGURE 2 is a rear end elevation of the device shown in FIG. 1, certain parts being shown in section for the sake of clarity.
Figure 6:
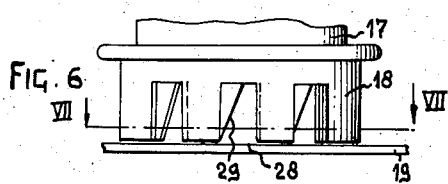
FIGURE 6 is a detail view in elevation of the sleeve used to control discharge of material from the container.

As shown in the figures, the device comprises a curved frame 1, which is secured to a frame 2. The frame 2 is provided with bearings 3 and 4, in which running wheels 5 and 6 are arranged. The frame 1, which is curved in a manner such that parts thereof lie in two substantially horizontal planes, constitutes a support for a conical container or hopper 7. To this end the ends of the frame 1 are arranged in the upper plane and are provided with connecting strips 8 and 9. The container 7 is provided with projections 10 and 11, which lie each on one side of the strip 8 fixed to the frame 1. The container is provided on the other side with a locking member 12, which comprises a locking pin 13, which is urged by a spring 14 in a given direction. The locking pin 13 extends through a hole 15 in the strip 9 and thus constitutes the sole fastening for the container 7 to the frame 1. The lower end 16 of the conical container 7 is cylindrical and is surrounded by a cylindrical annulus 17, which constitutes the lower part of the container wall. The cylindrical annulus 17 is rotatable about the lower end 16 and is adapted to move to a certain extent in a vertical sense. The annulus 17 is surrounded by a cylindrical sleeve 18, which is rotatable about the annulus 17 and is adapted to move in a vertical sense similar to the annulus 17.

The annulus 17 and the sleeve 18 bear with their own weight on an ejector disc 19, so that satisfactory joint between the disc 19 and the annulus 17 and the sleeve 18 is obtained. The pressure of the annulus 17 and the sleeve 18 on the disc 19 may, if desired, be increased by providing springs or weights on top of the annulus 17 and the sleeve 18. The ejector disc 19 is secured on a shaft 20, which is rotatably journalled in a bearing 21, which is secured to the frame 2. The ejector disc 19 is set rotating from the running wheels 5 and 6 by means of gear wheels 22 and 23, which are arranged on the shaft 20 and an axle 24, respectively, the latter connecting the running wheels 5 and 6 to each other.

For the supply of the material to the ejector disc the annulus 17 is provided with three trapezoidal apertures 25, 26 and 27, of which one side, for instance the side 28, is formed by the disc 19, which is at an acute angle to another side, for instance the side 29. In the sleeve 18 are the apertures 30, 31 and 32, which are rectangular in shape. By turning the sleeve 18 about the annulus 17, the outlet apertures 25, 26 and 27 can be reduced and enlarged, so that the quantity of material supplied to the ejector disc can be controlled. The material is conducted to the outside from the container through the apertures 25, 26 and 27.

As shown in FIGURE 5, the disc 19 is provided with an anticaking member 33 which projects into the container and acts upon the material and which has a surface 34 sloping upwardly with respect to the direction of rotation of the ejector disc 19. This member 33 prevents the material from caking in front of the apertures 25 to 27 and from giving rise to choking.

In order to ensure a satisfactory supply of material to the apertures 25 to 27, the container is provided furthermore with an agitator 35, which is connected with the shaft 20 by means of a universal joint 36. At the top end of the agitator 35, which has a height approximately half the height of the container 7 and which extends from the bottom approximately halfway up through the container, a disc 37 of rubber or other shock-absorbing material and a weight 38 are carried. Owing to its connection with the shaft 20, the agitator 35 is kept rotating, so that the material is supplied in a constant flow to the apertures, due to the vibration caused by the travel of the rubber disc on the inner wall of the container. The engagement of the disc with the container will vibrate the same and the material will thus be worked loose. The effect of the vibrations is enhanced by the weight 38 provided on the shaft 20.

In order to ensure a satisfactory distribution of the material over the surface to be covered, the material must be supplied to the ejector disc 19 in at least at two places. An efficient distribution of the material is obtained in the present embodiment by providing three apertures in the annulus 17, these apertures having the same distance from the shaft 20 owing to the circular form of the annulus 17, and being spaced apart from one another by a distance which is smaller than the radius of the annulus 17.

It is furthermore desirable that the lines of connection between the outer sides of the apertures farthest spaced apart from each other should be at an angle to the shaft 20, which is at least 45°. In the present embodiment the lines of connection between the outer sides of the apertures 25 and 27 are at an angle of about 90° to the shaft 20. In order to ensure that material can be conducted away through the apertures 25 to 27, even if they have been reduced by a displacement of the sleeve 18, one edge of each of these apertures is inclined to the vertical.

Since it must be possible to employ the device for spreading various kinds of material and since a satisfactory distribution requires that the material should be spread over a surface extending approximately over the same distance on either side of the device, the apertures 25 to 27 can be rotated around the axis of the ejector disc 19, so that the position of the apertures relative to the direction of travel can always be adapted to the kind of material to be spread. This displacement can be obtained by turning the annulus 17 about the lower end 16 of the container 7. The annulus 17 can be turned about the lower end 16 by means of a lever 39, which is connected with the annulus 17 by means of two arms 40 and 41. The position of the annulus 17 with respect to the lower end 16 of the container 7 can be locked by means of a locking pin 42, which is arranged on the arm 39 by putting it through one of the holes 44 provided in the strip 43 carried by the frame 1.

Since it bears on the disc 19, the sleeve 18 will be moved by the disc in a direction which coincides with the direction of rotation of the disc 19. The movement of the sleeve 18 is limited, however, by a stop 45, which is provided on an arm 46, connected with the sleeve 18. This stop 45 engages the end 47 of the arm 39. In order to screen the apertures 25 to 27 to a greater or smaller extent by the sleeve 18, the stop 45 can be adjusted relative to the sleeve 18. This adjustment can be achieved by turning the arm 46, which extends through one end 47 of the lever 39, by means of a crank 48. By this turning movement the distance between the sleeve 18 and the stop 45 will increase or decrease, since the arm 46 has one threaded end in a threaded tube 49, connected with the sleeve 18. By limiting the movement of the sleeve 18 about the annulus 17 by means of the stop 45, described above, the sleeve 18 may be moved to and fro about the annulus 17 in the event of an accumulation of material in front of the apertures 25 to 27, the stop 45 then moving to and fro in front of the end 47 of the arm 39. Owing to the rocking movement of the sleeve 18 about the annulus 17, the material will be worked loose. Since the arm 46 is linked to the arm 39, the position of the stop 45 relative to the sleeve 18 and hence the size of the apertures will not be varied, when the apertures 25 to 27 are turned with respect to the disc.

As is shown in FIGURE 1, the container or hopper 1 is substantially conical in shape and has the rear portion of its upper rim bent inwardly to form a screen for any material scattering about.

In order to allow the device to be transported on the road without the disc being set rotating, the drive from the running wheels 5 and 6 can be disconnected. This disengagement is also important when rounding the ends of a field, if the device is employed for spreading artificial fertilizers or similar material on land. This disconnection is made possible by the provision of clutches 50 and 51 on the axle 24, actuated by means of a lever 52. The clutch 50 consists of a hub 53, which is rigidly connected with the running wheel 5 and which is freely rotatable about the shaft 24, and of a ring 54, which is adapted to slide over the axle 24 in an axial direction, but not to rotate about this axle when the hub and the ring are disconnected. The hub 53 and the ring 54 are both provided with teeth 55, which mesh with each other, so that the hub 53 and the ring 54 can be coupled with each other. The clutch 51 is formed in the same manner as the clutch 50 and is provided with a hub 56 and a ring 57. The rings 54 and 57, which are constantly urged towards the hubs 53 and 56 by springs 58 and 59, are connected with the arm 52 by means of a rod mechanism.

This rod mechanism comprises two forked arms 60 and 61, which are rotatable about pivots 62 and 63, arranged on a strip 64, which is connected with the bearings 3 and 4. With the arms 60 and 61 are connected rods 65 and 66, which are coupled with each other by a lever 67. The lever 67, which is rotatable about a pivot 68, is connected with a bar 69, which is provided at the front end with a fork 70, between whose limbs an arm 71 is arranged. The arm 71 is connected with a pivot 72, which is arranged rotatably on the arm 73. The arm 71 is connected by means of the pivot 72 with the arm 52. By moving the arm 52 backwards, the lever 67 turns about the pivot 68, so that the arms 65 and 66 move outwardly and the arms 60 and 61 rotate about the pivots 62 and 63 and by means of the springs 58 and 59 and the rings 54 and 57 are connected with the hubs 53 and 56. By moving the arm 52 forwardly the clutch rings and in turn the drive of the disc 19 from the running wheels 5 and 6 will be disengaged. Since the connection of the arm 71 with the fork 70, upon a rotation of the arm 52, turns beyond the dead point of the pivot 72, and immediately thereupon bears on the arm 73, the arm 52 does not require an additional locking member. During travel the device is drawn by the bar 73, which is rotatably connected with the frame member 1 by means of the bar 74. The position of the draw bar 73 is determined by the link 75, which can be secured in different holes 76 of the strip 77 carried by the bar 73 in order to adjust the position of the same.

With the embodiment shown the ejector disc 19 is provided with six blades 78, which extend beyond the ejector disc 19 and which are curved, viewed from above, the rounded sides of these blades viewed in the direction of rotation of the disc 19 being orientated backwardly. The blades are arranged in a manner such that the inner end 78A of a blade is tangential to the periphery of the ejector disc, whereas the outer end 78B of a blade is substantially radial to the periphery of the ejector disc.

Each blade 78 is shaped in the form of a channel, of which the sides 79 and 80 are at an angle to each other of less than 90°. Towards the end of a blade 78 the angle between the sides decreases gradually and near the end 78B of a blade, i.e. near that part which is remotest from the shaft 20, they are substantially parallel to each other.

In order to prevent the material from leaving the disc 19 without being spread by the blades 78, upright edges 81 are provided, which extend from the convex side of a blade 78 to the supply opening 82 of a further blade 78. Since part of the disc 19, arranged at a lower level than the running wheels 5 and 6, is located at a lower level than the highest points of the running wheels 5 and 6, the ends of the blades 78 are curved upwardly with respect to the disc 19, so that the blades throw the material over the running wheels 5 and 6.

Figure 8:
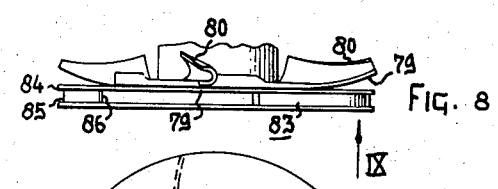
FIGURE 8 is a side elevation of a further embodiment of a detail of the device shown in FIG. 1.
Figure 7:
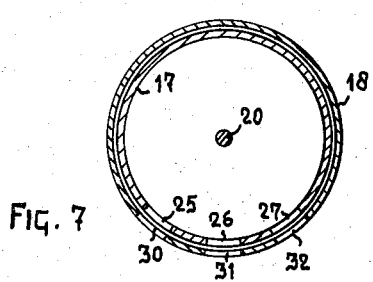
FIGURE 7 is a sectional view taken on the line VII—VII of FIG. 6.
Figure 9:
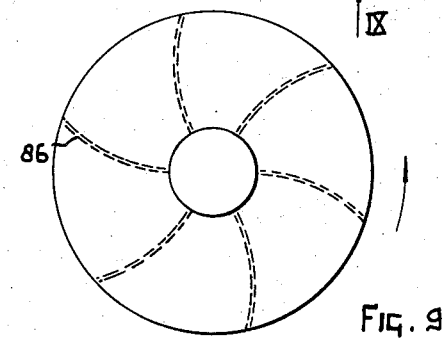
FIGURE 9 is a bottom view of the embodiment shown in FIG. 8 looking in the direction of the arrow IX.

As shown in FIGS. 8 and 9, a blade may be provided on the bottom side with a blower 83, which consists of two plates 84 and 85, between which curved blades 86 are provided. These curved blades are directed forwardly with respect to the direction of rotation of the disc 19. Such a blower produces a stream of air away from the disc 19. Particularly when light substances are spread, this flow of air will have a favorable effect on the distribution of the material.

Although, as shown in FIGS. 8 and 9, a special blower is provided below the disc 19, the ejector disc 19 may alternately be constructed in a manner such that the blower blades serve at the same time as the material distribution blades.

Since the ends of the frame 1, which support the container 7, and of which one end is located on that side of the device, where the ejector disc moves backwardly, extend away from the container to the front side and then bend downwardly to extend backwardly below the ejector disc, no parts of this frame are located in front of the ejector disc at the area where the material is ejected from the disc, so that a satisfactory distribution of the material is ensured.

The portions of the left-hand and right-hand parts of the frame 1 which extend backwardly are connected with each other by a part which extends parallel to the axle 24 and which extends beyond the periphery of the disc 19 with the blades 78, so that it constitutes a guard bar to protect the ejector disc.

The description and drawings disclose two embodiments of the invention, and specific language has been employed in describing the figures. It will, nevertheless, be understood that no limitations of the scope of the invention are thereby contemplated, and that various alterations and modifications may be made as would occur to one skilled in the art to which the invention relates.

We claim:

1. A device for spreading granular or powdery material comprising a container, an ejector disc disposed substantially horizontally under said container, and an anti-caking member disposed on the upper surface of said disc for acting upon material in said container and having a planar surface inclining from substantially the upper surface of said disc upwardly with respect to the direction of rotation of the disc.

2. A device for spreading granular or powdery material comprising a container for said material, the lower portion of said container being substantially open, an ejector disc disposed substantially horizontally under said container, the lower portion of said container bear upon the upper surface of said ejector disc, said disc forming part of the bottom of said container, a member disposed on the upper surface of said disc within said container for acting upon material in said container and having a surface sloping upwardly with respect to the direction of rotation of said disc, a plurality of blades on said disc, each of said blades being outside of said container, said blades extending substantially radially outwardly and being inclined upwardly with respect to said disc, and a centrifugal blower situated under said disc to produce a stream of air moving radially away from said disc.

3. A device for spreading granular or powdery material comprising a container for said material, an ejector disc disposed substantially horizontally under said container, said container having an outlet aperture for discharge of said material to said ejector disc, said ejector disc constituting part of the bottom of said container, a plurality of blades on said ejector disc extending substantially outwardly therefrom and inclined upwardly with respect thereto, and a centrifugal type blower disposed substantially under said ejector disc to produce a stream of air radially away from said ejector disc.

4. A device for spreading granular or powdery material comprising a container for said material, an ejector disc disposed substantialy horizontally under said container, said container having an outlet aperture for discharge of said material to said ejector disc, a central portion of said ejector disc constituting a part of the bottom of said container, a member disposed on the upper surface of said portion for acting upon material in said container having a surface inclined upwardly with respect to the direction of rotation of said ejector disc, and a plurality of blades on said ejector disc extending substantially outwardly from said portion and inclined upwardly with respect to said ejector disc.

5. In a device for spreading granular or powdery material, a container for said material, at least one aperture in the lower portion of said container, the base of container being open, an ejector disc disposed substantially horizontally under the base of said container, the base of said container bearing upon the upper surface of said ejector disc, a member disposed on the upper surface of said ejector disc having a surface sloping upwardly with respect to the direction of rotation of said ejector disc whereby material in the bottom of said container is prevented from caking in front of said aperture.

6. A device for spreading granular or powdery material comprising a container, an ejector disc disposed substantially horizontally under said container, said ejector disc constituting at least partly the bottom of said container, and an anti-caking member disposed on the upper surface of said ejector disc in the portion thereof constituting the bottom of said container, said member having a planar surface inclining from substantially the upper surface of said ejector disc upwardly with respect to the direction of rotation of said ejector disc.

7. A device for spreading grannular or powdery material comprising a container, an ejector disc disposed substantially horizontally under said container, said ejector disc constituting at least partly the bottom of said container, and a member disposed on the part of the upper surface of the said ejector disc constituting the bottom of said container, said member extending from the axis of rotation of said ejector disc to at least substantially near the wall of the container, said member having a surface inclining upwardly with respect to the direction of rotation of said ejector disc, said surface extending over substantially the total length of said member.

8. A device for spreading granular or powdery material comprising a container for said material, an ejector disc disposed substantially horizontally under said container, said container having an outlet aperture for discharge of said material to said ejector disc, a plurality of blades on said ejector disc for ejecting said material substantially radially from the disc, and a blower disposed substantially under said ejector disc, said blower having blades extending substantially radially from the axis of rotation of the blower and being mounted to at least one plate arranged substantially perpendicular to said axis to produce a stream of air radially away from said ejector disc.

9. A device for spreading granular or powdery material comprising a container for said material, an ejector disc for flinging said material substantially outwardly therefrom disposed substantially horizontally under said container, an aperture included in said container for discharge of said material to said ejector disc, and a blower connected to said disc and disposed substantially thereunder, whereby said blower produces a stream of air moving outwardly relative to the central portion of said ejector disc to converge with the material flung outwardly from said ejector disc.

References Cited in the file of this patent
UNITED STATES PATENTS

| | | |
|---|---|---|
| 856,632 | Griswold | June 11, 1907 |
| 1,224,082 | Drake | Apr. 24, 1917 |
| 1,263,105 | Plummer | Apr. 16, 1918 |
| 1,414,580 | Peterson | May 2, 1922 |
| 1,924,825 | Young | Aug. 29, 1933 |
| 2,573,784 | Asbury | Nov. 6, 1951 |
| 2,672,259 | Hobgood | Mar. 16, 1954 |
| 2,686,045 | Byberg | Aug. 10, 1954 |
| 2,766,872 | Pillsbury | Oct. 16, 1956 |
| 2,874,878 | Stokland | Feb. 24, 1959 |
| 2,882,060 | Speicher | Apr. 14, 1959 |

FOREIGN PATENTS

| | | |
|---|---|---|
| 277,633 | Great Britain | Nov. 24, 1927 |
| 566,127 | Great Britain | Dec. 14, 1944 |
| 683,299 | Great Britain | Nov. 26, 1952 |